US008533658B2

(12) United States Patent
Patten et al.

(10) Patent No.: US 8,533,658 B2
(45) Date of Patent: Sep. 10, 2013

(54) SYSTEM AND METHOD FOR TEACHING SOFTWARE DEVELOPMENT PROCESSES

(75) Inventors: Terry A. Patten, Oak Hill, VA (US); Dennis V. Pereira, Oak Hill, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1160 days.

(21) Appl. No.: 12/453,396

(22) Filed: May 8, 2009

(65) Prior Publication Data

US 2010/0021870 A1 Jan. 28, 2010

Related U.S. Application Data

(60) Provisional application No. 61/129,880, filed on Jul. 25, 2008.

(51) Int. Cl.
*G06F 9/44* (2006.01)

(52) U.S. Cl.
USPC ........... 717/100; 717/102; 717/103; 717/105; 717/109; 717/135; 703/16; 703/17; 709/203

(58) Field of Classification Search
None
See application file for complete search history.

(56) References Cited

U.S. PATENT DOCUMENTS

| | | | | |
|---|---|---|---|---|
| 6,067,538 A * | 5/2000 | Zorba et al. | | 706/47 |
| 6,160,987 A * | 12/2000 | Ho et al. | | 434/350 |
| 7,200,545 B2 * | 4/2007 | Lines et al. | | 703/21 |
| 7,349,837 B2 * | 3/2008 | Martin et al. | | 703/22 |
| 7,613,599 B2 * | 11/2009 | Bade et al. | | 703/14 |
| 7,788,647 B2 * | 8/2010 | Martin et al. | | 717/135 |
| 7,861,158 B2 * | 12/2010 | Martin et al. | | 715/243 |
| 2002/0133325 A1 * | 9/2002 | Hoare et al. | | 703/17 |
| 2002/0169658 A1 * | 11/2002 | Adler | | 705/10 |
| 2003/0033588 A1 * | 2/2003 | Alexander | | 717/107 |
| 2003/0074177 A1 * | 4/2003 | Bowen | | 703/22 |
| 2003/0105620 A1 * | 6/2003 | Bowen | | 703/22 |

(Continued)

OTHER PUBLICATIONS

Title: Supporting agent-based distributed software development through modeling and simulation, author: Lie Cai et al, source: IEEE, dated: 2003.*

(Continued)

*Primary Examiner* — Chameli Das
(74) *Attorney, Agent, or Firm* — Andrews Kurth LLP; Sean S. Wooden; Matthew J. Esserman

(57) ABSTRACT

An exemplary system and method are disclosed for interactively teaching software development processes to multiple users. The exemplary system may include a discrete event simulator for teaching software development that allows a software development team to simulate an entire software development project much faster than real time. The system teaches an entire software development team a set of formal or informal processes using a project simulation. In the course of using the system, each member of the team learns the processes, and together, the entire team learns how to use the processes as a team. The system enables each team member to learn software development processes as well as how those processes translate into team interactions in practice. The system also enables the team to learn how to apply the processes in difficult situations.

23 Claims, 17 Drawing Sheets

(56) References Cited

U.S. PATENT DOCUMENTS

| | | | |
|---|---|---|---|
| 2006/0190280 A1* | 8/2006 | Hoebel et al. | 705/1 |
| 2007/0061183 A1* | 3/2007 | Seetharaman et al. | 705/9 |
| 2007/0129927 A1* | 6/2007 | Chussil et al. | 703/16 |
| 2007/0191110 A1* | 8/2007 | Crouse | 463/43 |
| 2008/0059621 A1* | 3/2008 | Raghavan et al. | 709/223 |
| 2008/0196006 A1* | 8/2008 | Bates et al. | 717/109 |
| 2009/0204463 A1* | 8/2009 | Burnett et al. | 705/8 |
| 2009/0228253 A1* | 9/2009 | Tolone et al. | 703/6 |
| 2010/0010789 A1* | 1/2010 | Hazard | 703/6 |
| 2010/0100510 A1* | 4/2010 | Balaban et al. | 706/12 |

OTHER PUBLICATIONS

Title: Simulation based software development, author: Baker etal, source: IEEE, dated: 1994.*

* cited by examiner

FIG. 5

TUTORIAL — DEFINING THE FUTURE

RED 'X' NEXT TO IT. TO RELEASE A TASK FOR ANOTHER TEAM MEMBER TO SELECT. CLICK THE BUTTON CONTAINING THE RED 'X' IN THE "ASSIGN TO" COLUMN.

OTHER TYPES OF INFORMATION YOU CAN ENTER INCLUDE: TASK NAMES, TASK ESTIMATES, FOR COMPLETION, AND TASK PRIORITIES.

DURING YOUR PLANNING IT IS IMPORTANT TO SELECT THE "STORY" THAT IDENTIFIES THE HIGH-LEVEL FEATURE THAT TASK SUPPORTS. STORIES WILL BE USED BY THE PRODUCT OWNER TO TRACK PRODUCT COMPLETION.

AFTER YOU HAVE FINISHED SELECTING YOUR TASKS AND EDITING THE INFORMATION

CONTROLLER
AUDIO ON | OFF
STOP TUTORIAL

- CONFIGURATION
- DEVELOPER_ALISON
- DEVELOPER_MARY

DEVELOPER_ALISON HAS JOINED THE ROOM
DEVELOPER_MARY HAS JOINED THE ROOM
DEVELOPER_MARY CONFIGURATION HAS JOINED THE ROOM

BACK TO PLANNING

PLANNING TASKS | STORIES

TASK HANDLER

| TASK # | THIS SPRINT* | TASK | CUM. EST. | ESTIMATE | ASSIGN TO | OWNER PRI. | CUM. PRI. | YOUR PRI. |
|---|---|---|---|---|---|---|---|---|
| 1 | ☑ | SUBMIT DOCUMENT | 60.0 | 60.0 | MARY | 3 | 3 | 3 |
| 2 | ☑ | EXTRACT INPUT TO XML | 300.00 | 300.00 | MARY | 4 | 4 | 4 |
| 3 | ☐ | PREPROCESS TEXT INPUT XML | 300.00 | 300.00 | ALLISON ✕ | 5 | 5 | 5 |
| 4 | ☐ | CREATE DIRECTORY LISTING | 240.00 | 240.00 | ALLISON ✕ | 1 | 1 | 1 |
| 5 | ☐ | ZONE MESSAGE | 240.00 | 240.00 | ALLISON ✕ | 2 | 2 | 2 |

502

COMMIT TO COMPLETE YOUR SELECTED SPRINT TASKS

LESSONS LEARNED LIBRARY

| TOPIC | DATE | NOTES |
|---|---|---|
| CONFIGURATION ROOM | 11/1/07 | THERE IS SOMETHING HERE ABOUT CONFIGURATION ROOM THAT DOES SOMETHING BUT I AM NOT SURE OF THE PROPERTIES INVOLVED AND SO I AM NOT SURE. DOES THAT MAKE SENSE? |
| PREREQUISITE ROOM | 12/11/07 | GRIDBAGLAYOUT IN THE ROOM WAS DIFFICULT TO COME BY. THE PROBLEM WAS NOT IN THE ORDER OF GRIDBAGLAYOUT IN THE X AND Y COORDINATES, BUT RATHER THE SOLUTION WAS SIMPLY CALLING A DIFFERENT PANEL. |

PLANNING SPECS
SPRINT LENGTH:
ACCUMULATIVE TASK TIME:
AVAILABLE HOURS:

PROCEED TO MAIN>>>

SYSTEM AND METHOD FOR TEACHING SOFTWARE DEVELOPMENT PROCESSES

This application claims the benefit of U.S. provisional application No. 61/129,880, filed on Jul. 25, 2008, which is hereby incorporated by reference in its entirety.

BACKGROUND

Software engineering or software development is performed by teams that often follow a set of processes or methodologies. These processes vary greatly, ranging from processes that prescribe every step in detail and require every step to be documented, to agile processes that avoid rigid detail and documentation. As a result, software developers often have to learn new processes that are very different from the processes they already know and implement. There are several issues that make teaching software development processes difficult. One of these issues is the difficulty of teaching how to apply software development processes in practice, as opposed to simply teaching the steps in the processes. Another issue with current methods for teaching software development processes is the difficulty of teaching software developers how to effectively interact with other team members while developing software. Effective interaction amongst development teams is essential to the success of large scale software development projects. Another issue that arises in teaching software development processes is on-the-job training that can be disruptive and can delay software development projects.

Currently, paper-based simulations are commonly used to introduce teamwork and interaction to software development training. However, using paper-based simulations to teach software development dictates that the simulations must be extremely simple, or the simulations will take too much time to complete. Furthermore, paper-based simulations simulate time ineffectively, and time and schedule are critical issues for software development processes.

Current simulations involving several team members include multi-role video games. However, multi-role video games have an extremely simple model of time since multi-role video games operate in real time. In contrast, a software development project needs to be simulated much faster than real time. A development project that may take several months to complete usually needs to be simulated in one day. Training for multiple trainees using discrete event simulation has been restricted to extremely complex and expensive systems used by the military to teach military tactics, for example.

A current software project simulator is referred to as SimSE, which is described in a 2006 PhD dissertation by Emily Oh Navarro at the University of California at Irvine. SimSE focuses on teaching a single user, i.e., the project manager, rules of thumb concerning software development team size and how hard to push the team during the development project. SimSE does not allow training of other team members and does not allow team interaction.

Current systems for facilitating group learning are described, for example, in U.S. Pat. No. 6,160,987 entitled Computer-Aided Group Learning Environment (the '987 patent), U.S. Pat. No. 7,200,545 entitled, System and Method for Simulating Computer Network Devices for Competency Training and Testing Simulation (the '545 patent), and U.S. Pat. No. 6,067,538, entitled System, Method, and Article of Manufacture for a Simulation Enabled Focused Feedback Tutorial System (the '538 patent). The '987 patent discloses a system that facilitates group learning, where a group works together to solve problems. The '545 patent describes a user interacting with simulated network devices. The interface presents various scenarios, allowing the user to understand the behavior of network devices. The '538 patent describes an expert system that watches the learner interact with a simulated business environment consisting of spreadsheets, e-mail, etc. The system notes mistakes made by the user and generates realistic consequences. None of the patents describe interactive, team-based methods for teaching software development processes.

SUMMARY

A system for teaching software development processes includes a simulation server that keeps track of a current state and time of a simulation of a software development process, and generates random and scenario-driven events in the simulation that simulate a project as part of the software development process. The system further includes two or more simulation clients associated with two or more users, each simulation client including a graphical user interface (GUI) for displaying the current state of the simulation, enabling the associated user to perform simulated process actions as part of the simulation, and enabling the associated user to interact with other users to learn the software development process. The system further includes a network that facilitates communication between the simulation server and the two or more simulation clients.

An embodiment of a method for teaching software development processes is executed on a computer including a processor and a memory. The method includes using a simulation server that runs on the processor to detect input and determine whether the input is from a simulation client or from a discrete event simulator. The input includes information regarding a simulation of a software development process. The simulation server keeps track of a current state of the simulation and generates random and scenario-driven events in the simulation that simulate a project as part of the software development process. The method further includes using the processor to parse the input from the simulation client to determine whether the input is an update to project data or a new event. If the input is an update to the project data, the simulation server modifies the project data and determines whether a new event exists. If a new event exists, the simulation server sends information regarding the new event to the discrete event simulator to schedule the new event.

Another embodiment of a method for teaching software development processes is executed on a computer including a processor and a memory. The method includes using a simulation client that runs on the processor to detect input and determine whether the input is from a simulation server or from a user associated with the simulation client. The input includes information regarding a simulation of a software development process. The simulation server keeps track of a current state of the simulation and generates random and scenario-driven events in the simulation that simulate a project as part of the software development process. The simulation client includes a graphical user interface (GUI) for displaying the current state of the simulation. If the input is from the user, the simulation client determines whether the input is an update to client data or a new event. If the input is an update to the client data, the simulation client sends the update to the simulation server using a network. If the input is a new event, the simulation client notifies the simulation server.

Yet another embodiment of a method for teaching software development processes is executed on a computer including a processor and a memory. The method includes using a discrete event simulator that runs on the processor to initialize simulation queues of events from a simulation server. The simulation server keeps track of a current state of a simulation of a software development process and generates random and scenario-driven events in the simulation that simulate a project as part of the software development process. The discrete event simulator determines whether each event is a new event. If the event is a new event, the method includes using the processor to break the event into discrete increments and put the discrete increments in a simulation queue, and randomly generating delay events as a function of real time such that one second of simulation time corresponds to a few minutes of real time. If the event is not a new event, the discrete event simulator moves a simulation clock to a next increment in the simulation queue, simulates the next increment, and sends new simulation state information to the simulation server.

DESCRIPTION OF THE DRAWINGS

The detailed description will refer to the following drawings, wherein like numerals refer to like elements, and wherein:

FIG. 5 shows an exemplary planning interface of the system;

FIGS. 6A-6D show exemplary main simulation interfaces of the system;

FIGS. 7A and 7B illustrate exemplary interface screens of the system showing a report of a successfully completed simulated project and an unsuccessfully completed simulated project, respectively;

DETAILED DESCRIPTION

An exemplary system and method are disclosed for interactively teaching software development processes to multiple users. The exemplary system may include a discrete event simulator for teaching software development that allows a software development team to simulate an entire software development project much faster than real time. For example, if the processes and scenarios have been entered into the system ahead of time, the simulation for a several-month project may be completed within a few hours of real time.

The system for teaching software development processes may teach an entire software development team a set of formal or informal processes using a project simulation. In the course of using the system, each member of the team learns the processes, and together, the entire team learns how to use the processes as a team. Interactions between team members are an essential part of software development processes, and effective interactions between team members are essential to project success. The system enables each team member to learn software development processes as well as how those processes translate into team interactions in practice.

The system for teaching software development processes also enables the team to learn how to apply the processes in difficult situations. An example of a difficult situation that may arise in a normal software development cycle is when a key team member cannot perform his or her duties on schedule. For instance, a particular team member may be sick on the day he or she is required to perform a task. Another example is when a team member is busy doing tasks with a higher priority. The scenarios of possible difficult situations that may arise during software development can be simulated so that the team can learn how to deal with these types of situations. The system effectively teaches the practical application of software development processes by teaching the pitfalls associated with the processes, how to avoid the pitfalls, and how to recover from the pitfalls. Accordingly, by teaching the development team how to deal with difficult situations, the system provides the development team the confidence needed to act decisively and effectively during project execution.

The system for teaching software development processes simulates the actual software development process using, for example, an interactive discrete event simulation. This technique allows all the team members to go through the steps in their development processes much faster than real time.

Figure 1:
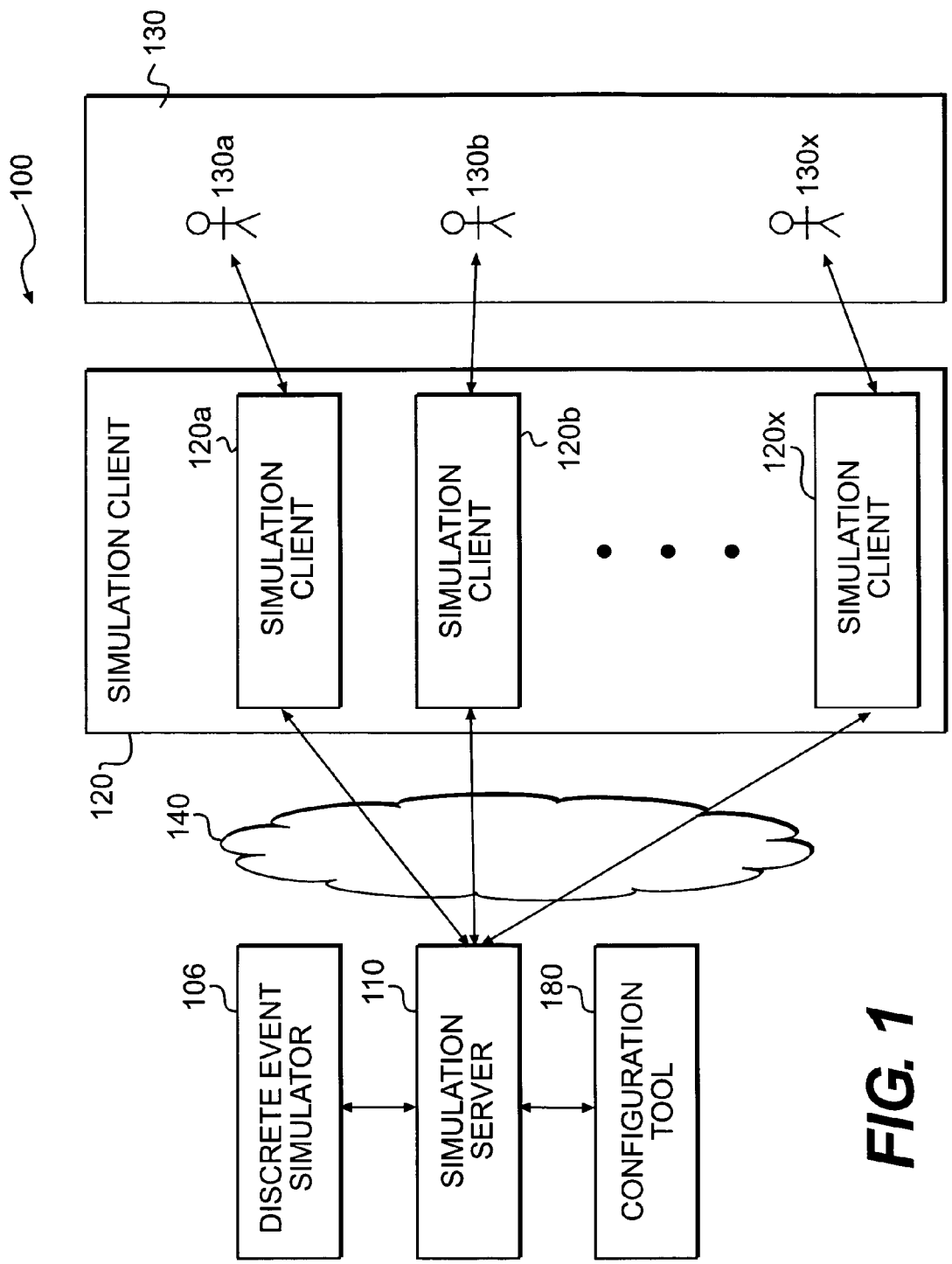
FIG. 1 shows a block diagram of an exemplary system for teaching software development processes.

FIG. 1 shows an exemplary block diagram of a system 100 for teaching software development processes. The system 100 may include a simulation server 110 and a number of simulation clients 120, such as simulation clients 120a, 120b, and 120x, that are connected to the simulation server 110. The simulation server 110 keeps track of the state of a simulation, keeps track of a simulated time, and generates random and scenario-driven events that simulate unplanned interruptions and distractions, such as an unexpected resource loss or a discovery that leads to significant improvement in team efficiency, that make applying processes difficult in real situations. The simulation server 110 may include a computer that includes a processor and a memory (not shown). The memory may include instructions for a server program that are accessible through a datapath using the processor. The memory may further include a discrete event simulator 106 that is accessible by the server program using a datapath. The simulation server 110 may be accessible by the simulation clients 120 using a network 140. In another embodiment, one or more simulation clients 120 may be run on the same processor as the simulation server 110. In still another embodiment, the discrete event simulator 106 may be run on a different processor than the simulation server 110.

Each simulation client 120 may be used by users or trainees 130, such as user or trainees 130a, 130b, and 130x, and may include a processor, memory, and input/output paths connected to a display device and an input device (not shown). The display device may include a display terminal. The input device may include a keyboard and a mouse, for example. Each simulation client 120 may also include various elements, such as disk drives, network connections, and additional keyboards (not shown). Each simulation client 120 may also include graphical user interfaces (GUIs) that are displayed on the display device, which displays the current state of the simulation so that the users can perform simulated process actions and the team members can interact with each other.

The simulation server 110 may include the discrete event simulator 106 to perform discrete event simulations. A discrete event simulation is typically based on events that have specified durations. Simulating an event involves modifying the state of the simulation according to the event description and advancing a simulation clock by the specified duration. The discrete event simulation may, for example, simulate an entire year in only a few seconds of real time because the simulation clock can jump by minutes, hours, days, weeks, or even months at a time.

In an embodiment of the system 100, the discrete event simulation may be slowed down by managing the simulation clock so that the team members have time to generate events that are required by the processes being learned. For example, a developer may schedule a two-hour design event, or a tester may start a one-hour testing operation. The discrete event simulator 106 also schedules events according to specified random distributions or according to scripted scenarios. All events, whether generated by users or by the discrete event simulator 106, may be broken up into small discrete increments before the events are processed by the discrete event simulator 106, allowing the events to interrupt each other. For example, a two-hour design event may be interrupted after 15 minutes by a 20-minute phone call generated at random by the discrete event simulator 106. The result is that, as in real life, the team members do not have complete control over their schedule. The discrete event simulator 106 can also randomly perturb the user events so that the user events actually take more or less time than the user planned. Even with the managed simulation clock, the simulation may move much faster than in real time, e.g., allowing a several-month project to be simulated in just a few hours.

In addition to performing the discrete event simulation, the simulation server 110 may manage communication between the discrete event simulator 106 and the simulation clients 120. The simulation server 110 accepts input from the simulation clients 120 and translates that input into events that the discrete event simulator 106 can understand. The simulation server 110 also accepts simulation state information from the discrete event simulator 106 and translates that simulation state information into information that the simulation client 120 can understand. For example, if a developer wants to schedule a two-hour development task, he or she will input information regarding the task into the simulation client 120 using a GUI. The simulation client 120 sends a message describing the task to the simulation server 110. The simulation server 110 translates the description into input for the discrete event simulator 106. As parts of each task are processed by the discrete event simulator 106, the simulation state information is passed back to the simulation client 120 so that the simulation client 120 can update a clock display and a task progress bar, for example.

The simulation client 120 accepts messages from the simulation server 110 and updates the GUI accordingly. The simulation client 120 accepts input from the user and sends messages to the simulation server 110 accordingly. In an embodiment, the simulation client's GUI displays a diagram of a software development process with the current step in the process highlighted. The software development process diagram provides a formal and concrete representation of the process and associates the current state with the process explicitly. In an embodiment, the simulation client's GUI may include an instructional window that provides context-sensitive hints and suggestions. The instructional window displays communication (live or scripted) from an instructor and prevents the users from having to learn entirely by trial and error. In an embodiment, the simulation server 110 and the client interfaces are networked to allow a team to work together even if they are physically separated from each other.

In an embodiment, a configuration tool 180 allows simulations to be customized for a particular team or a particular development project. The system 100 can be configured for any set of software development processes. Each set of processes to be taught has its own vocabulary and mechanisms. In general, in the embodiment shown there are three aspects of the system 100 to configure: 1) the discrete event simulator 106 is configured to model the target processes and the team; 2) the model is configured to include specific instructional scenarios; and, 3) the GUI of the simulation client 120 is designed and integrated.

In an embodiment, all communication between the simulation server 110 and the simulation client 120 is accomplished using a chat mechanism (e.g., over Extensible Messaging and Presence Protocol (XMPP)) on the simulation client's GUI. Specifically, the simulation server 110 may include a chat server that allows a remote simulation client 120a, for example, to login and communicate with another simulation client 120b, for example, that is logged in to the simulation server 110. The communications may include, for example, simulation state information, simulation time changes, and the like. The chat server performs the simulation actions, and the results are sent back to the simulation clients 120 through the chat mechanism.

Figure 2:
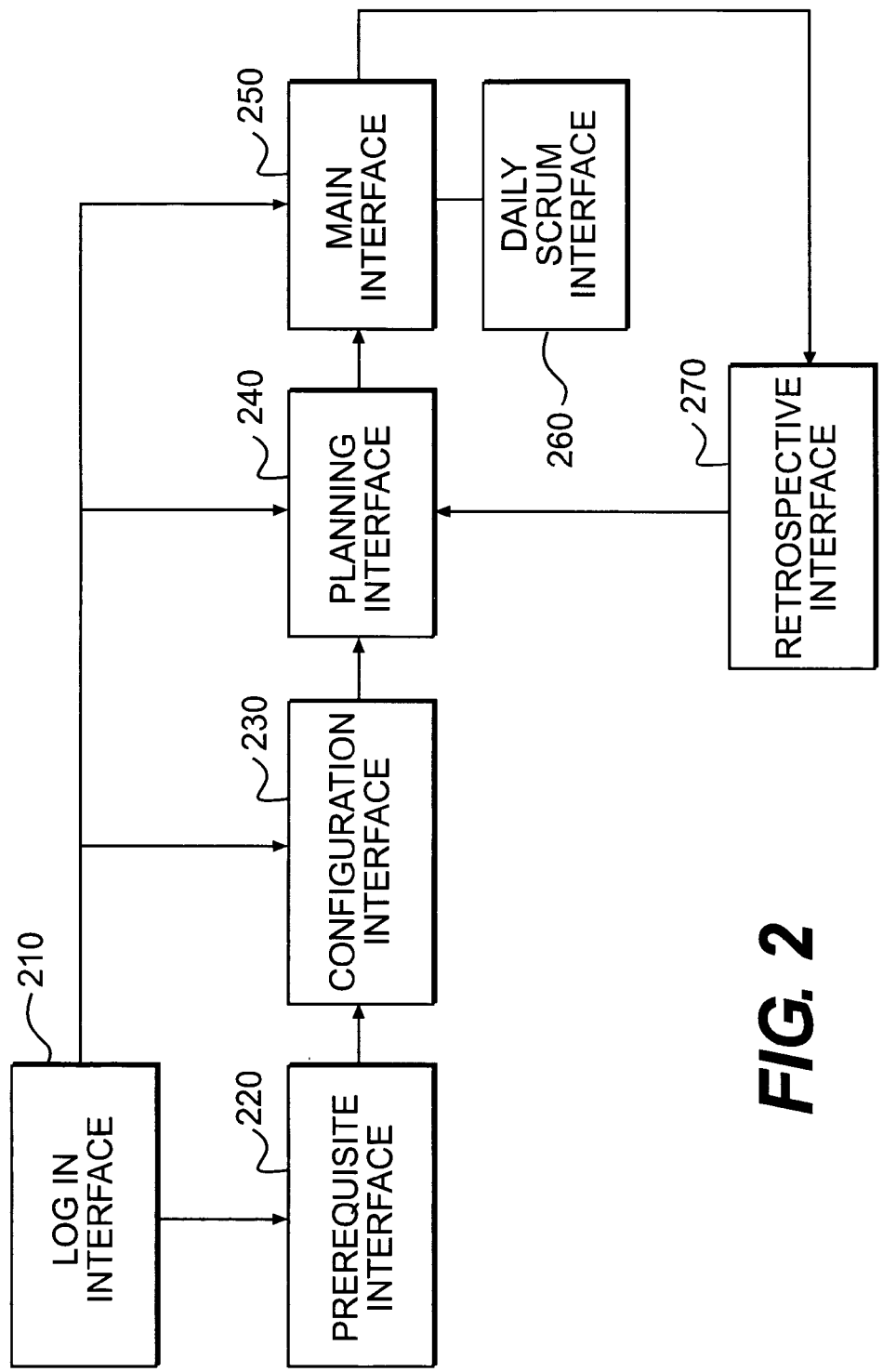
FIG. 2 illustrates a block diagram of an exemplary graphical user interface (GUI) of the system.

FIG. 2 is a block diagram of types of exemplary graphical user interfaces of the simulation client 120, showing how the interfaces are related. As shown, the exemplary interfaces for the system 100 for teaching software development processes may include a user login interface 210, an interface for introducing the system to users (e.g., a prerequisite interface 220), a configuration interface 230, a planning interface 240, a main interface 250, various interfaces 260 specific to a particular software development process to be taught, e.g., daily scrum interfaces, and a final result interface 270, e.g., a retrospective interface. In the example shown in FIG. 2, a scrum software development process is being taught. The scrum software development process may include a series of sprints, i.e., fixed time blocks, within which a subset of releasable system functionality is completed. Scrum may include the use of a product backlog that is a list of project requirements and system functionality that is ranked by priority, benefit, and level of completion difficulty. These metrics are established at the initial sprint planning session and are reprioritized after each sprint. The user login interface 210 may provide access to the specific user interface corresponding to the team's current phase of the process. For example, if the user logged out of the system 100 at the planning user interface screen and the team progressed beyond the planning phase, then the user may be presented with the screen corresponding to the team's current state after re-entering the simulation client 120. In addition, the interfaces of the simulation client 120 allows the team members to view instructional material and to interact with the project simulation running on the simulation server 110. The details of the interfaces may vary depending on the process being learned. Typically, the interfaces may include a simulation clock that indicates how much simulation time has elapsed, depictions of the relevant aspects of the simulation state (e.g., which tasks have been completed), and the means to generate events that impact the simulation.

Figure 3:
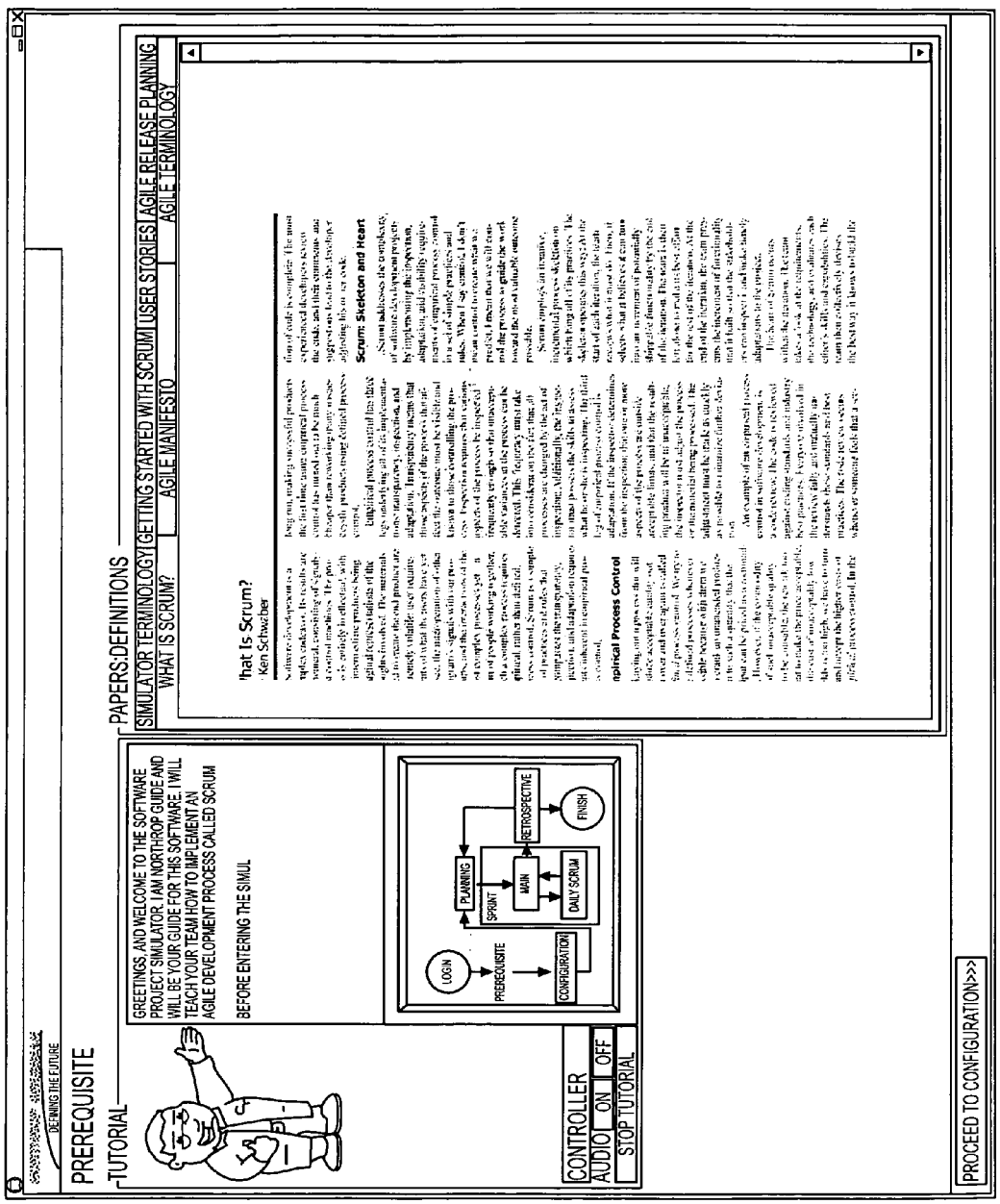
FIG. 3 shows an exemplary prerequisite interface of the system.

FIG. 3 shows an exemplary prerequisite interface 220. The prerequisite interface 220 may include various tabs that may include simulator terminology, getting started with scrum, user stories, agile release planning, agile manifesto, and agile terminology tabs. The tabs may lead to pages that serve to introduce the specific software development processes that may be taught through the system 100 to the user. The tabs may also lead to pages that serve to acquaint the user with the system's terminology along with agile development processes generally.

Figure 4A:
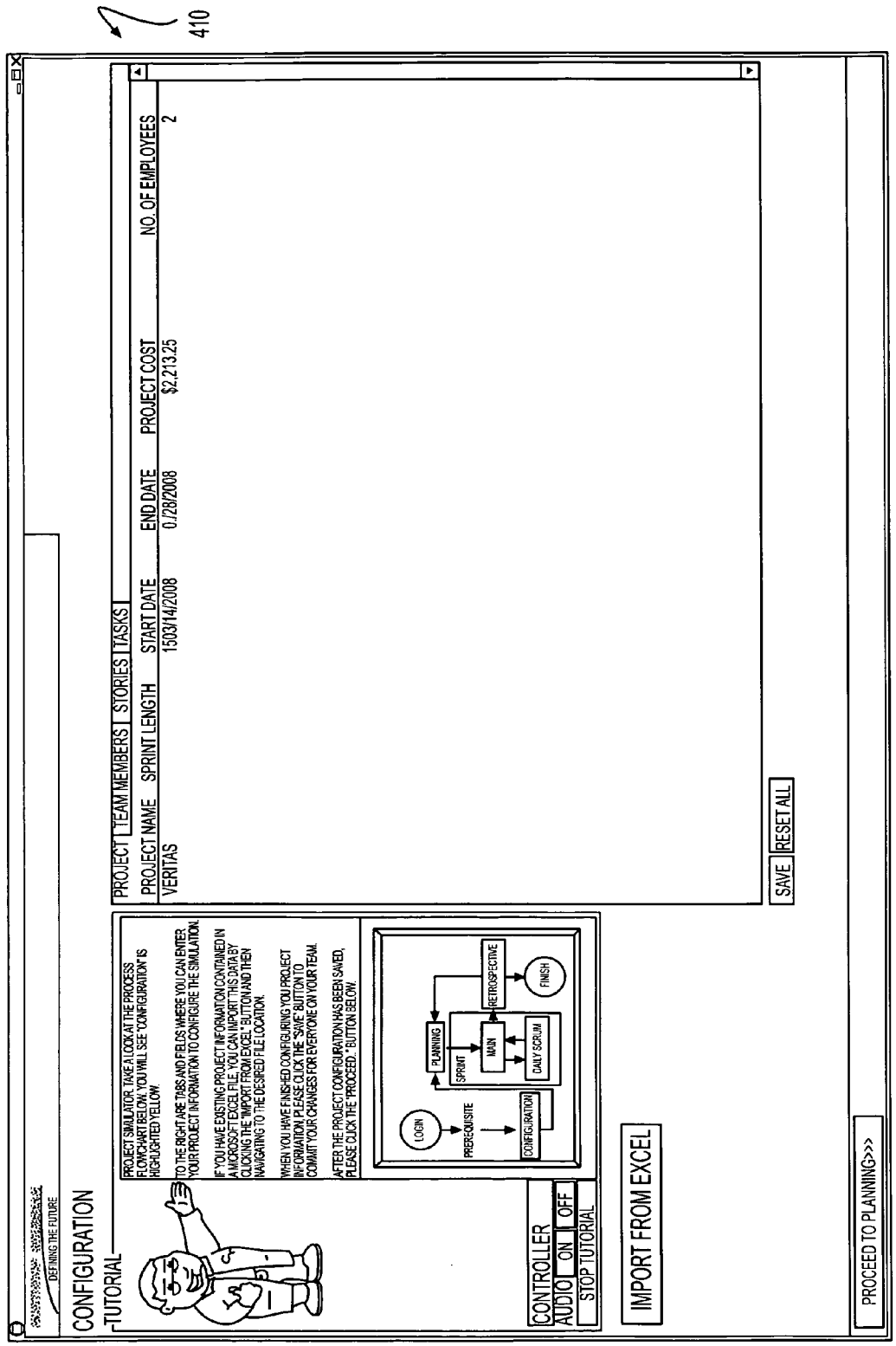
FIGS. 4A-4D show exemplary configuration interfaces of the system.
Figure 4B:
Figure 4C:
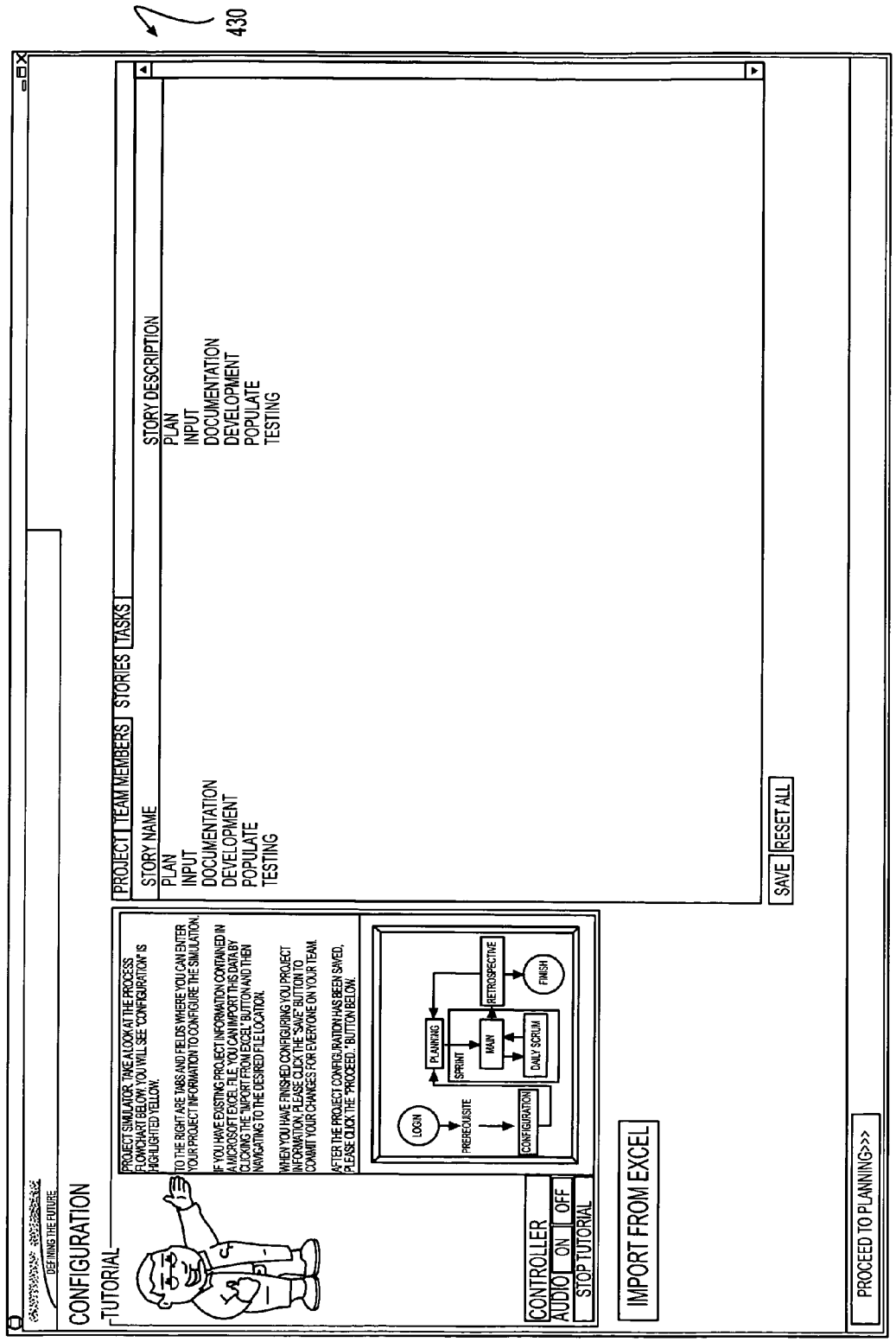
Figure 4D:
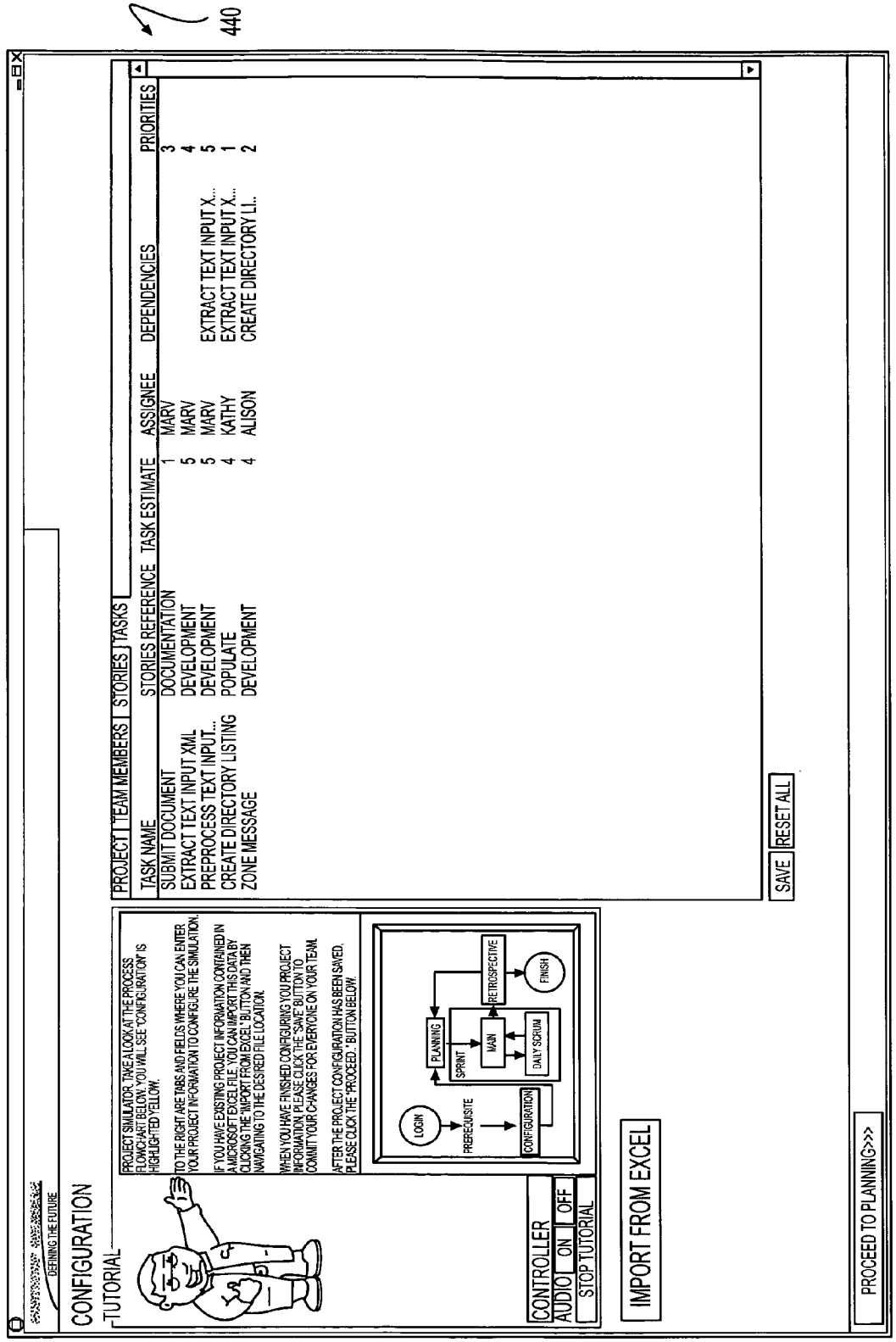

FIGS. 4A-4D show exemplary configuration screens 410-440 corresponding to the configuration interface 230. The configuration screens 410-440 may include tabs for corresponding screens, such as a project screen 410, a team member screen 420, a stories screen 430, and a task screen 440. Referring to FIG. 4A, the project screen 410 allows users to enter parameters, such as project name, sprint length (the duration of a work period during which an increment of product functionality is implemented), start date, end date, estimated project cost, and number of employees on the project. Referring to FIG. 4B, the team member screen 420 allows users to enter the names, roles, costs, and experience level (e.g., the amount of expertise a team member has in their assigned role) of the employees assigned to a development project. Referring to FIG. 4C, the stories screen 430 allows users to enter information about projects that may include a project plan, such as a management plan and project schedule, project input including input data needing to be acquired, project documentation including user and system documentation, project development tasks, and project testing tasks. Referring to FIG. 4D, the task screen 440 allows users to enter task names along with the estimated time for each task, the employee assigned to complete each task, the task dependencies (e.g., other tasks requiring completion before this task can be completed), and the priority of each task. The configuration interface 230 may have buttons to allow users to save, reset, and import information from a spreadsheet program, such as Excel.

FIG. 5 shows an exemplary planning interface 240 that may include a tutorial component that guides users on using the system 100 for teaching software development processes. The planning interface 240 may also have a task handler 502 that displays all defined tasks for completing the simulated project, chat mechanism that allows simulation participants to communicate with one another, and lessons learned archive components to display previous lessons learned while planning for future development sprints.

Figure 6A:
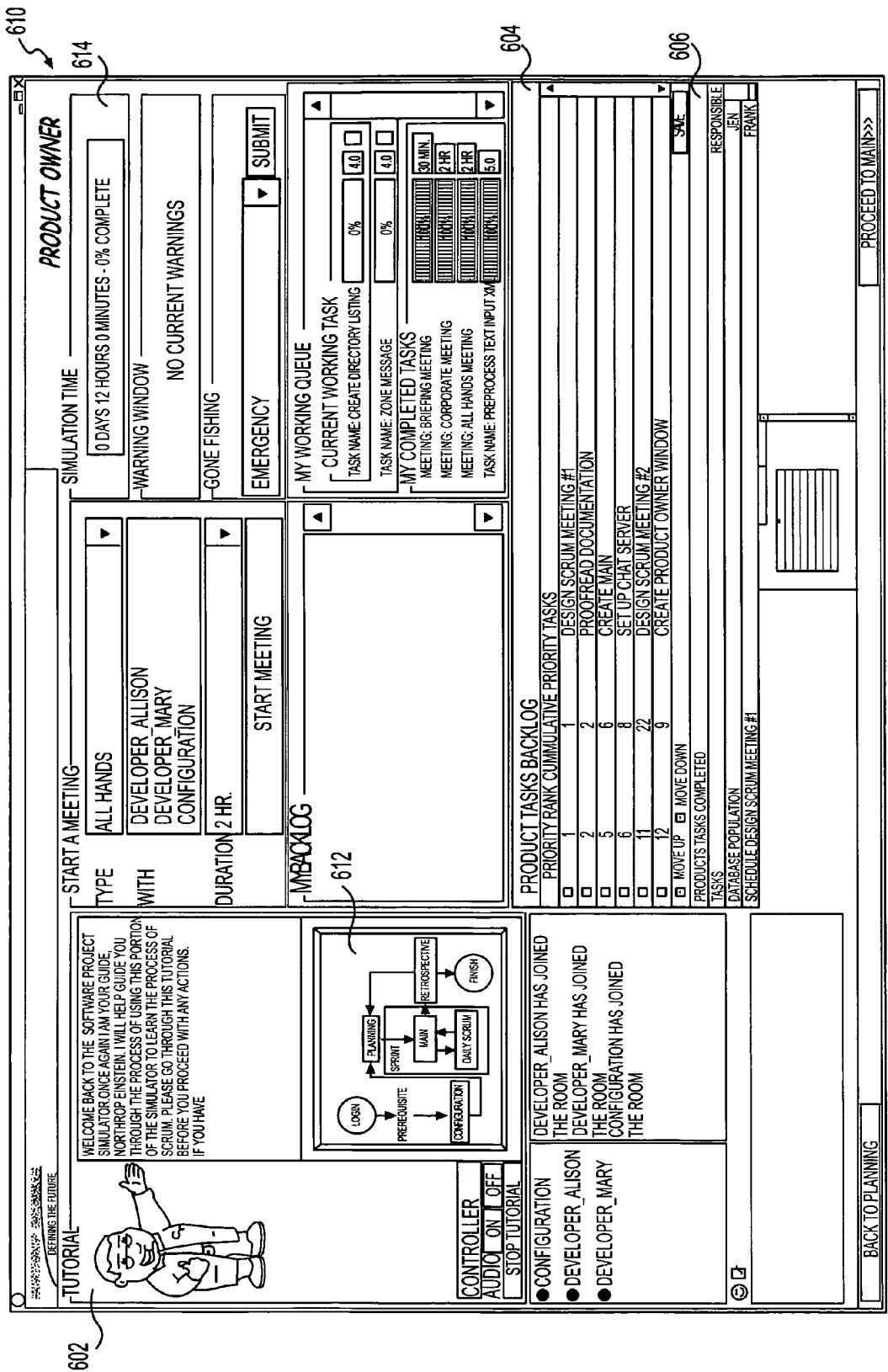
Figure 6B:
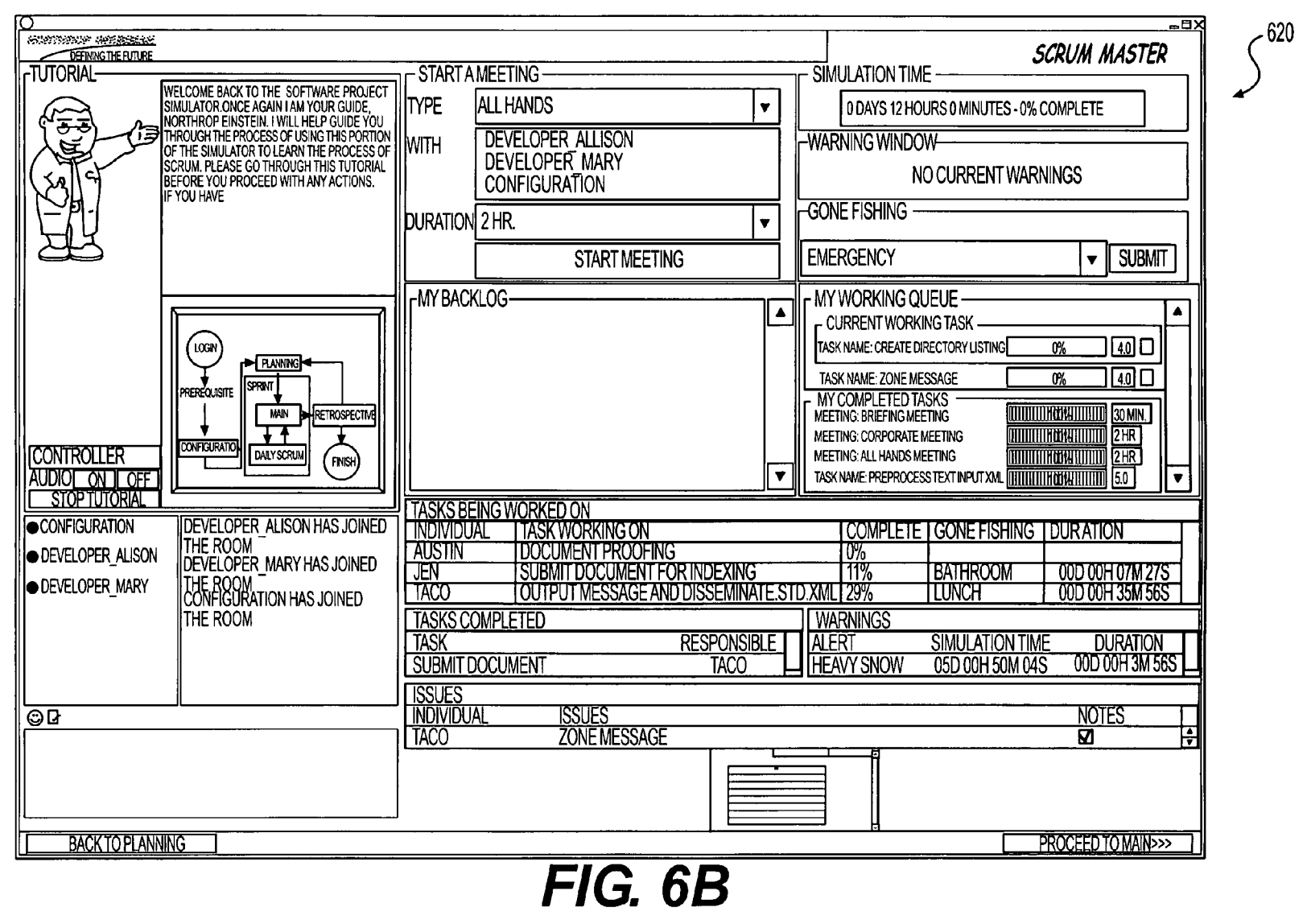
Figure 6C:
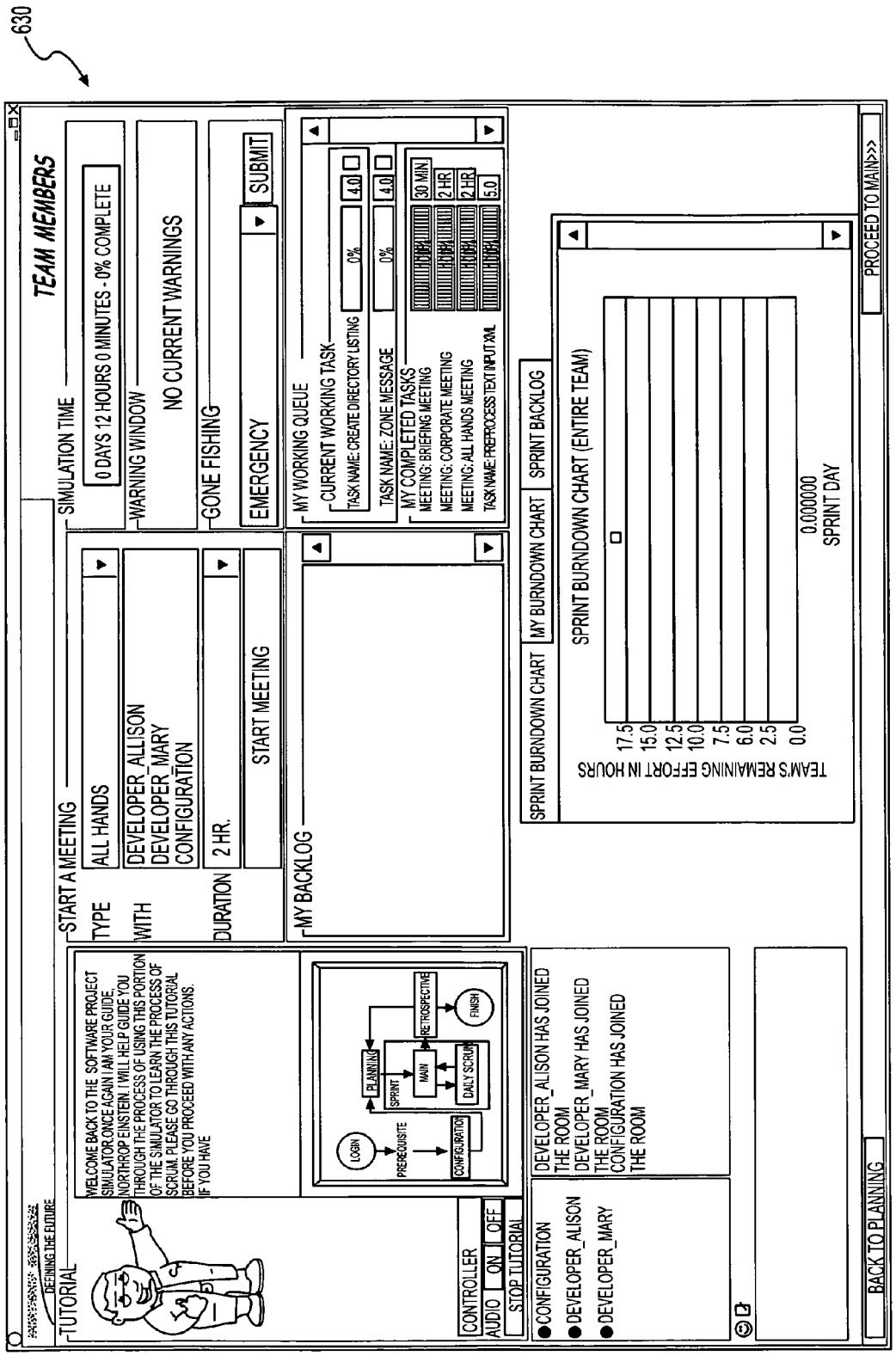

FIGS. 6A-6D show exemplary main simulation screens 610-640 corresponding to the main interface 250. FIGS. 6A-6C show different user types—Product Owner (FIG. 6A), Scrum Master (FIG. 6B), and Team Member (FIG. 6C). FIG. 6A shows a product owner screen 610 for use by a project customer. The product owner screen 610 may include a tutorial component 602 that guides users on using the system 100 for teaching software development processes, a chat mechanism, and various status components. The status components may include a product tasks backlog component 604 showing unfinished tasks, a product tasks component 606 showing completed tasks, metrics, charts 612 showing simulation progress, and a simulation clock showing the progress of the specified simulation length 614.

Figure 6D:
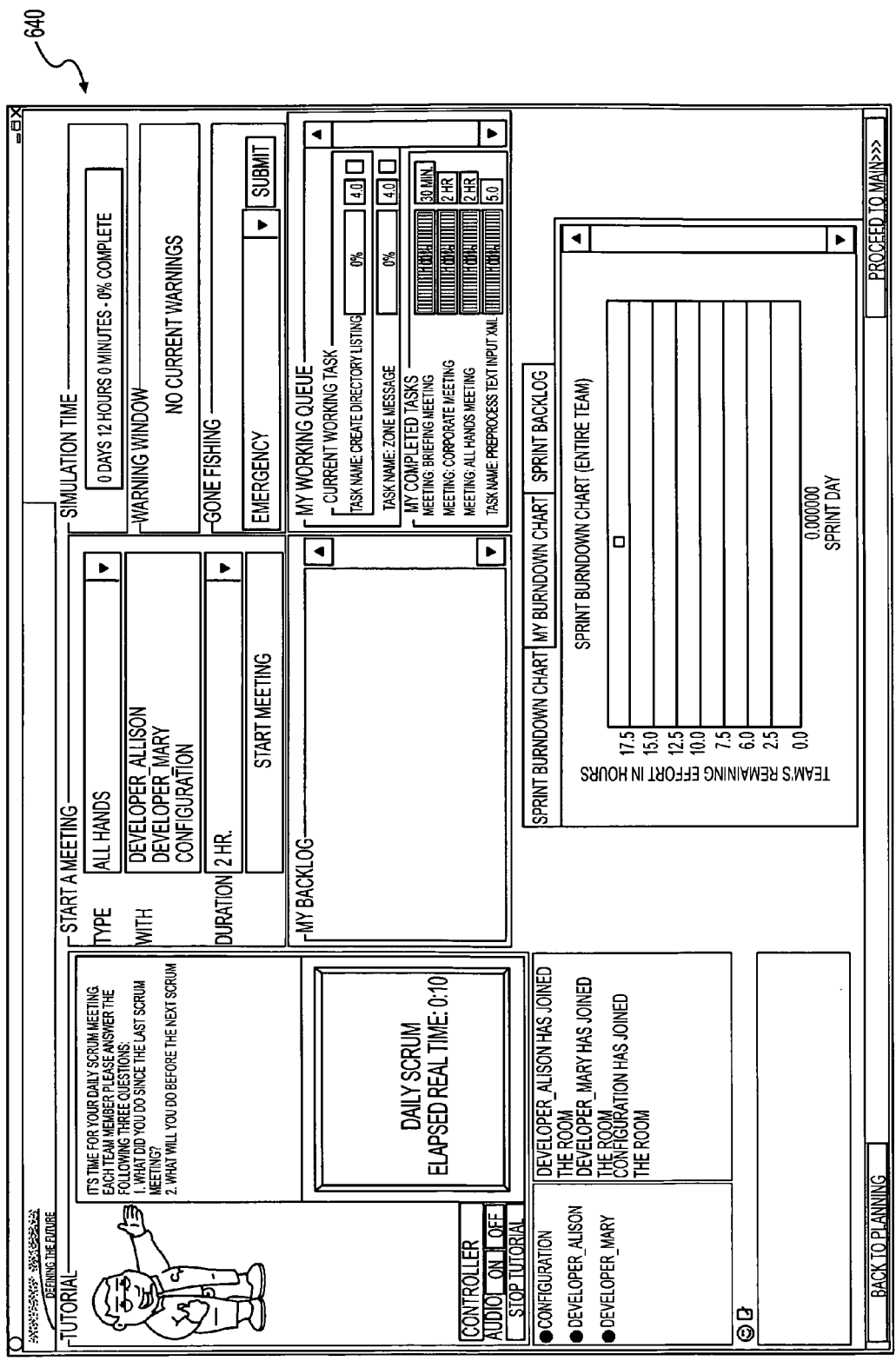

FIG. 6B shows a scrum master screen 620 for use by a team leader or a software development process manager when the software development process being taught is the scrum process. FIG. 6C shows a main simulation screen 630 that may be used by team members who are not the product owner or scrum master. Referring to FIG. 6D, when the scrum process is being taught, a scrum meeting screen 640 may be shown at a pre-defined time during the simulation. During a scrum meeting, the simulation is paused and the team members communicate progress, expectations, and impediments using the chat mechanism. The scrum meeting screen 640 includes an elapsed time indicating the real-time duration of the meeting.

Figure 7A:
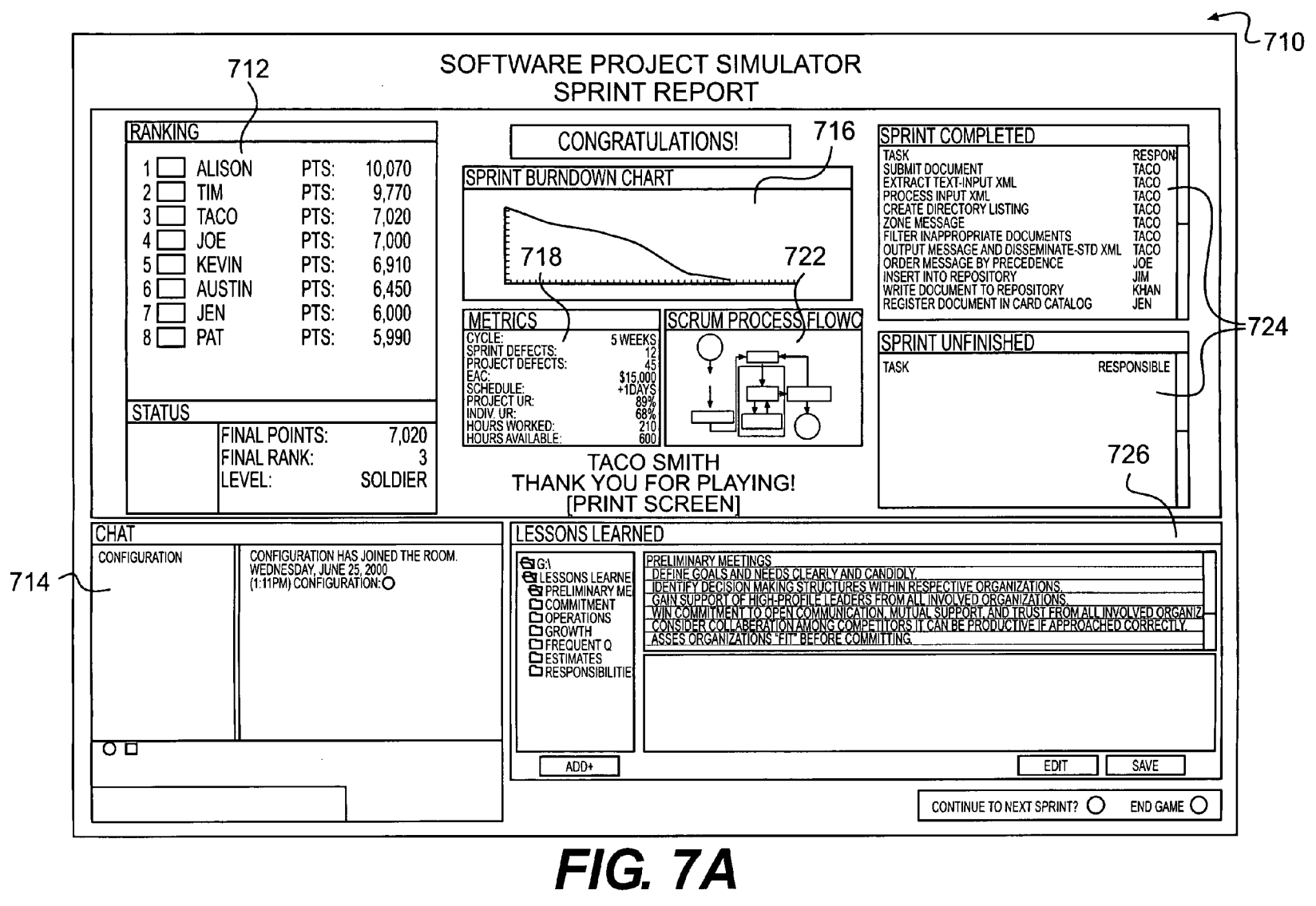
Figure 7B:
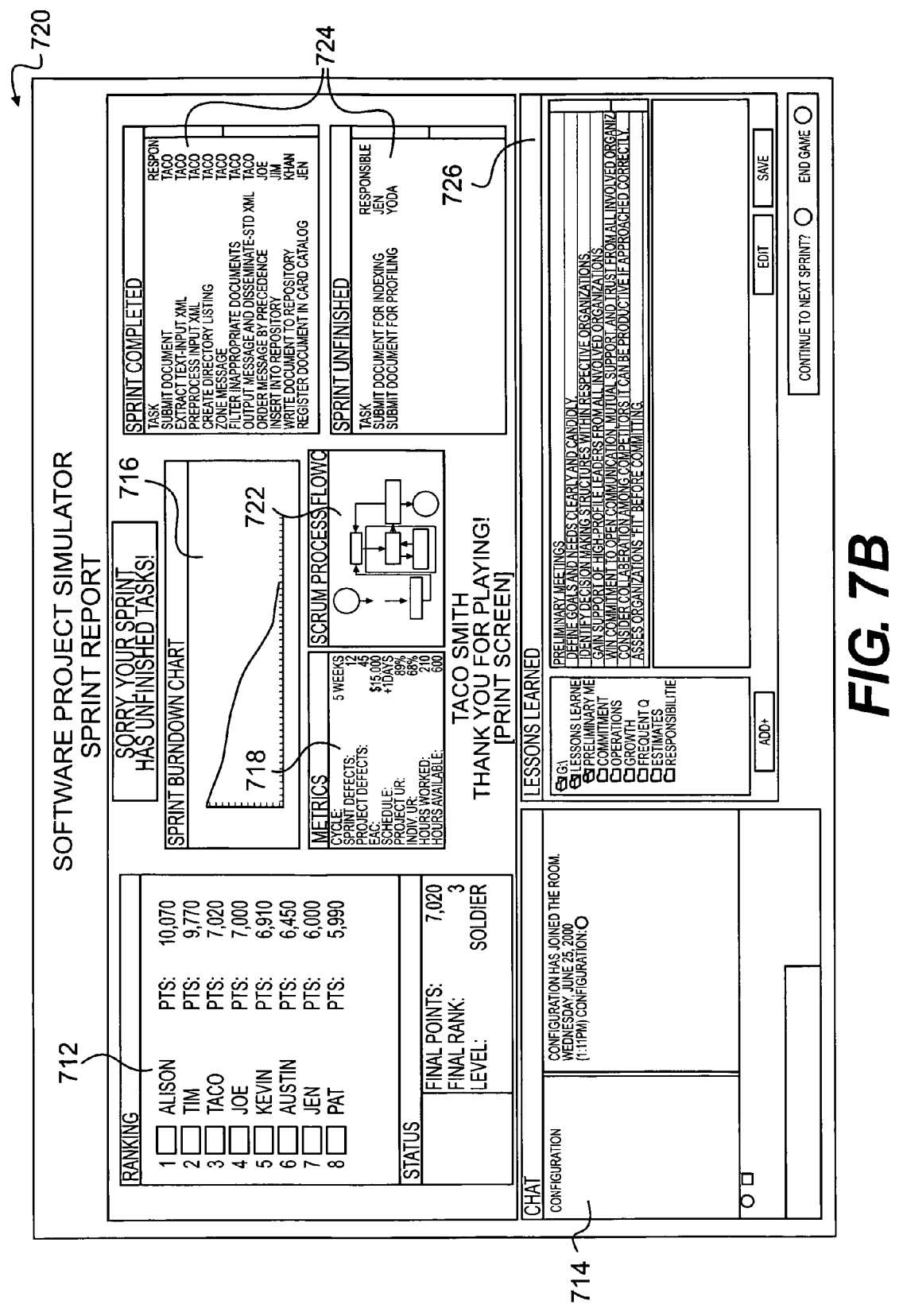

FIGS. 7A and 7B illustrate exemplary report screens 710 and 720 showing a report of a successfully completed simulated project (FIG. 7A) and an unsuccessfully completed simulated project (FIG. 7B). The report screens 710 and 720 include ranking components 712 that show the scores of each team member from a session with the system, a chat mechanism 714, various status components, such as a task progress window 724 showing completed and unfinished tasks, metrics 718, and charts 722 showing the progress of a simulation of a software development process. The report screens 710 and 720 also include a lessons learned component 726 that links to documents containing lessons learned during the simulation of the software development process. In the case where scrum is being taught, the screens 710 and 720 may also include sprint burndown charts 716 showing the progress of a sprint and scrum process flowcharts.

The interfaces may be built using any programming language used in the art of interface building, such as Java, for example. Each screen of the interfaces may include components in any aesthetically-pleasing arrangement within each interface screen and may be small, large, arranged in various ways in relation to each other, and in a variety of shapes and colors.

The system 100 for teaching software development processes may be used by an entire project team with each team member having a terminal. The system 100 can also be used by a single person with the computer playing the other roles on the team, or by any subset of a project team. The system 100 may be configured to enable simulation participants to be either in the same room or geographically dispersed.

The system 100 for teaching software development processes provides the hands-on training to both staff and customers that current products do not provide. In addition, the system and method for teaching software development processes can actively engage customers in developing and evaluating software development processes. The system and method for teaching software development processes may also be included as part of software development proposals to clients. More specifically, the system and method for teaching software development processes may be configured to simulate a particular software development project that a software development team is bidding on to demonstrate the software development team's capabilities. The system 100 may demonstrate to future customers the length of time a proposed software development project takes along each stage of the project. Moreover, the system 100 for teaching software development processes may exhibit processes that address various problem scenarios to future clients during presentations.

Furthermore, while some training firms provide paper simulations as part of an agile development training, paper simulations are not as versatile or efficient as the system and method for teaching software development processes. Similarly, paper simulations cannot be geographically distributed like the system 100 for teaching software development processes. The system and method may also enable a software development team to physically demonstrate its software development expertise to prospective customers. Currently, customers have to take claims on faith or assume success on previous projects will translate into success on the new project. The system and method for teaching software development processes enables a software development team to physically demonstrate their agile capabilities to customers in a tangible and interactive fashion, and the simulation can be tailored to the specific customer's processes and constraints.

Some versions of the system and method for teaching software development processes using higher fidelity models may enable users to predict project cost, to estimate schedules, or to calculate risks. The system 100 for teaching software development processes is a powerful knowledge management tool. In addition to storing knowledge about software processes, the system 100 for teaching software development processes also stores knowledge of pitfalls, risks, and other practical issues in the form of scenarios.

Figure 8:
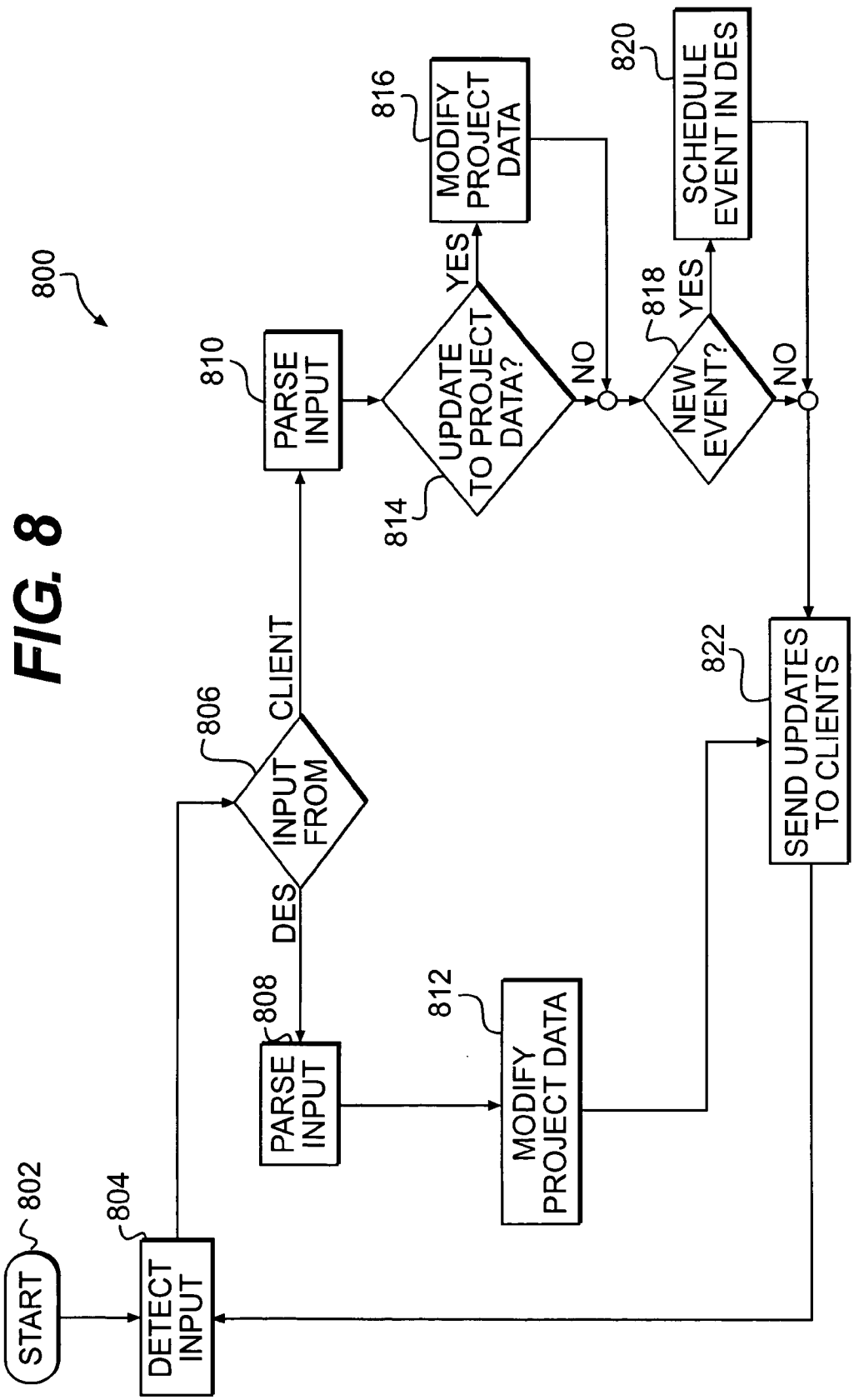
FIG. 8 is a flowchart illustrating an exemplary method for teaching software development processes.

FIG. 8 is a flowchart illustrating an exemplary method 800 for teaching software development processes. The method 800 starts 802 by using the simulation server 110 to detect input from the simulation client 120 and/or from a discrete event simulator 106 (blocks 804, 806). The input may include information regarding simulations of software development processes made by users using the interfaces of the simulation client 120. Input from the simulation client 120 is parsed (block 810) to determine whether (block 814) the input is an update to project data, such as a change in task position or a change in task properties such as estimated completion time (block 816), or a new event in a simulation (block 818). If the input is an update to project data (block 816), the simulation server 110 modifies the project data and determines whether there is a new event (block 818). If the simulation server 110 determines that a new event exists (block 818), the simulation server 110 sends the event information to the discrete event simulator 106 to schedule an event in the discrete event simulator 106 (block 820). The simulation server 110 may request or receive simulation state information from the discrete event simulator 106. The simulation server 110 translates the simulation state information into a format that the simulation client can understand (block 822). If the input detected is from the discrete event simulator 106 (block 808), the simulation server 110 parses the input and modifies the project data (block 812). The simulation server 110 sends the updates to the simulation clients (block 822).

Figure 9:
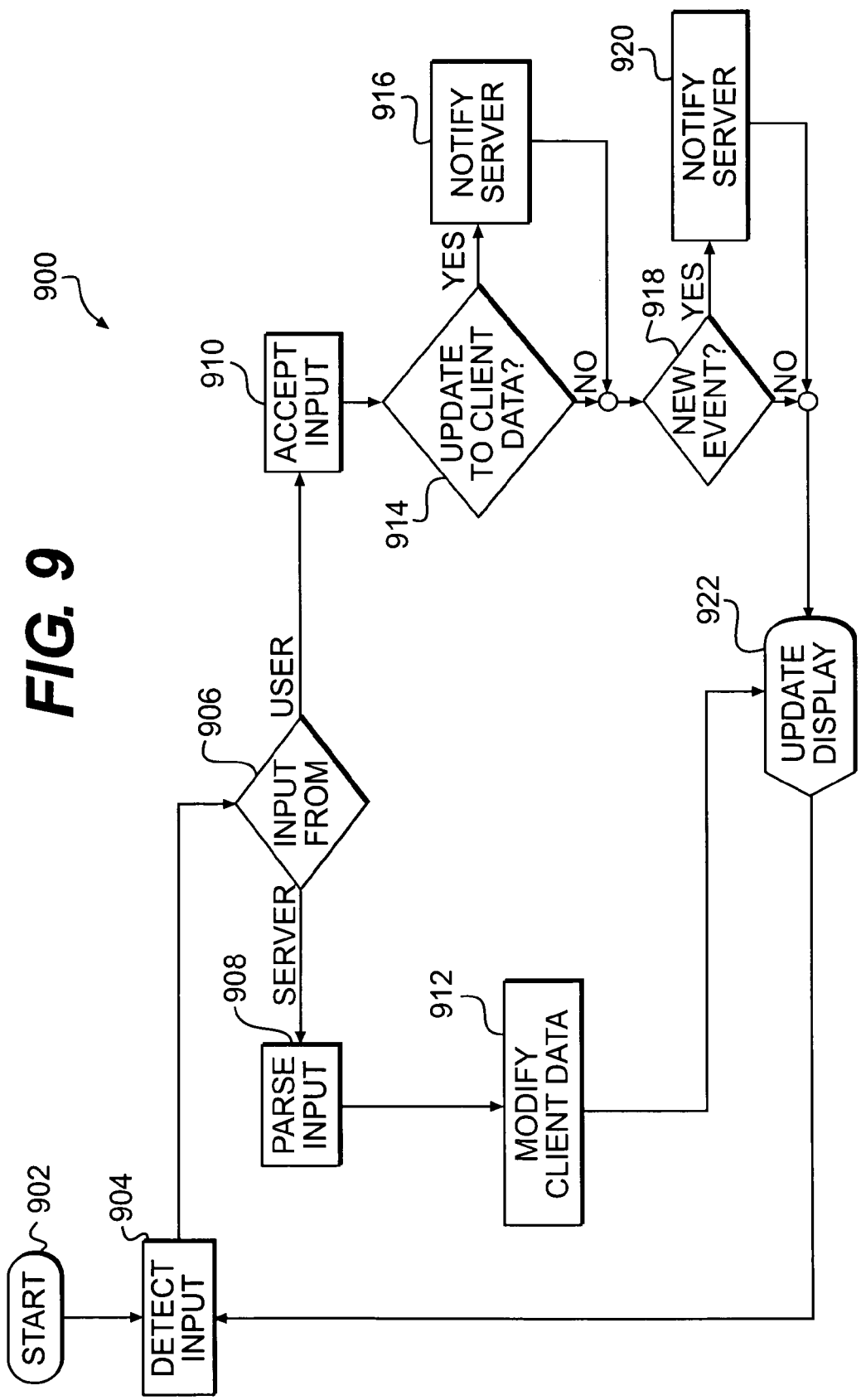
FIG. 9 is a flowchart illustrating an exemplary interaction between the simulation client and the simulation server of the system.

FIG. 9 is a flowchart illustrating an exemplary interaction 900 between the simulation client 120 and the simulation server 110. The interaction 900 starts at 902. The simulation client 120 may detect input (block 904) and determine whether it is from the simulation server 110 or from a user (block 906). If the input is from a user, the simulation client 120 accepts the input (block 910) and determines whether the input is an update to client data, such as a change in task position or a change in task properties such as estimated completion time (block 914). If the input is an update to client data, the simulation client 120 sends the update to the simulation server 110 (block 916). If the input is not an update to client data, the simulation client 120 determines whether the input is a new event (block 918). If the input is a new event (block 918), the simulation client 120 notifies the simulation server 110 (block 920). When the input is from the simulation server 110 (block 908), the simulation client 120 may parse the input, modify the client data (block 912), and update the interfaces to reflect the new data (block 922). In any case the interfaces may be updated to reflect the new input (block 922).

The simulation client 120 allows users of the system 100 for teaching software development processes to learn software development processes by facilitating interaction between the users and the simulation server 110. The users learn software development processes by viewing the simulation state information produced by the discrete event simulator 106 from the input that the users send to the simulation server 110 through the simulation client 120. The simulation client 120 sends the input to the simulation server 110 using a network or other known connection.

Another embodiment of the method 900 for teaching software development processes further includes transmitting the simulation state information to multiple simulation clients 120 over a network and displaying the information using a customized interface.

Another embodiment of the method 900 for teaching software development processes includes transmitting the simulation state information to multiple clients 120 over a network and displaying the information using a customized interface, when the interface is stored on the simulation server 110 and is accessible by the simulation clients 120 using the network.

Figure 10:
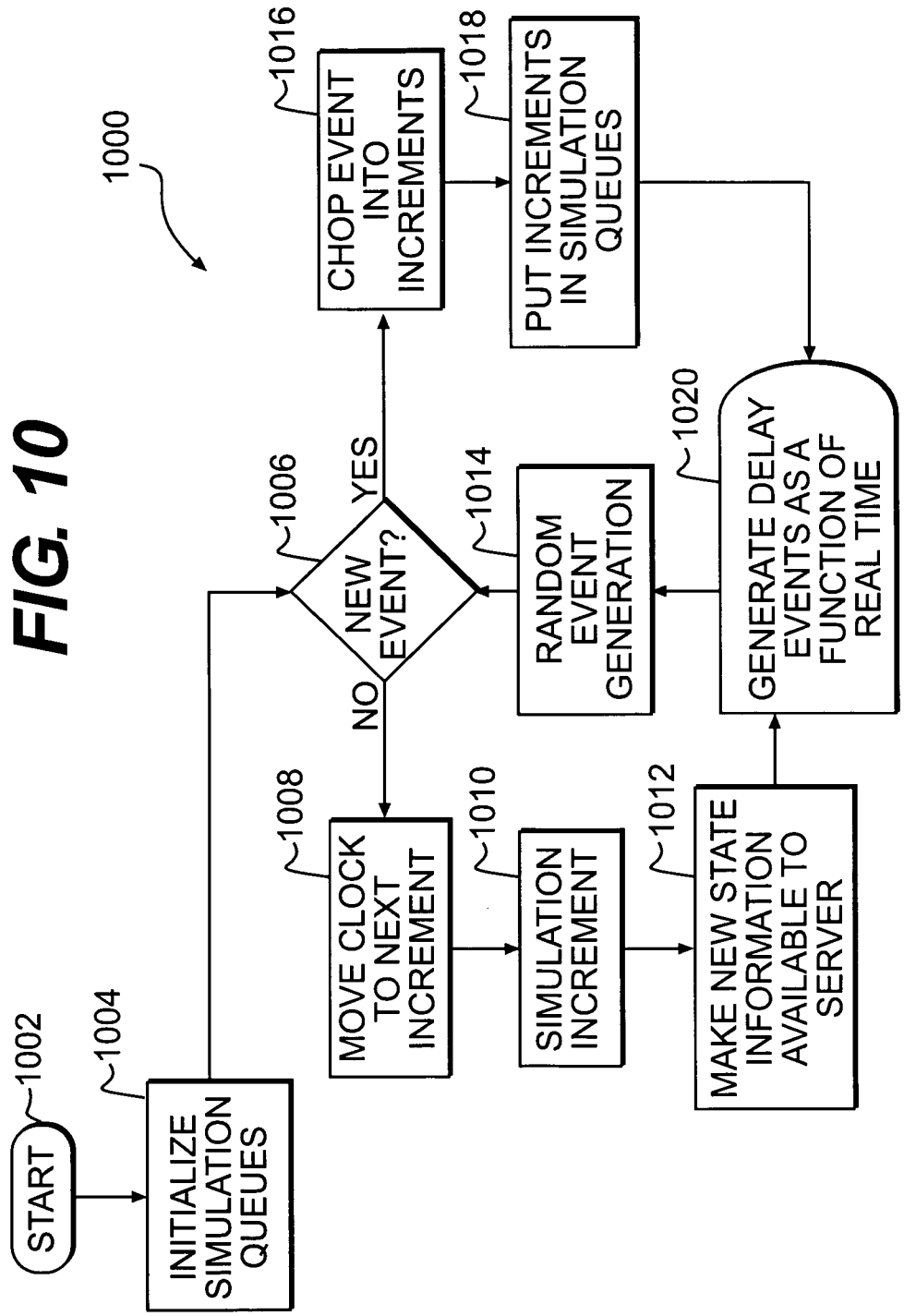
FIG. 10 is a flowchart illustrating an exemplary discrete event simulation of the system.

FIG. 10 is a flowchart illustrating an exemplary discrete event simulation 1000. The exemplary discrete event simulation includes simulation queues used for temporarily retaining and prioritizing events and event increments. The discrete event simulation 1000 starts at block 1002. The discrete event simulator 106 initializes simulation queues of events from the simulation server 110 (block 1004). The discrete event simulator 106 determines whether each event in a queue is a new event (block 1006). If an event in the queue is a new event, the event may be broken into discrete increments (block 1016) and the increments put in a simulation queue (block 1018). Delay events are also generated as a function of real time (block 1020) (e.g., one second of simulation time may correspond to ten minutes of real time). The delay events are randomly generated by the simulator according to a mathematical frequency distribution appropriate for each event type. The discrete event simulator 106 determines whether the delay events are new. If the discrete event simulator 106 determines that the events are not new (block 1006), the discrete event simulator 106 moves the simulation clock to the next increment in the simulation queue (block 1008), simulates the next increment (block 1010), and sends the simulation server 110 the new simulation state information (block 1012). New events may be sent to the discrete event simulator 106 from the simulation server 110.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for teaching software development processes, comprising:
    a simulation server that keeps track of a current state and time of a simulation of a software development process, and generates random and scenario-driven events in the simulation that simulate a project as part of the software development process, wherein the simulation server further includes a discrete event simulator that performs discrete event simulation, each discrete event that is simulated having a specified duration, by advancing a simulation clock through the specified duration;
    two or more simulation clients associated with two or more users, each simulation client including a graphical user interface (GUI) for displaying the current state of the simulation, enabling the associated user to perform simulated process actions as part of the simulation, and enabling the associated user to interact with other users to learn the software development process, wherein the discrete event simulator breaks up scenario-driven events generated by the two or more users or by the discrete event simulator into small discrete increments before processing the scenario-driven events, allowing the scenario-driven events to interrupt each other; and
    a network that facilitates communication between the simulation server and the two or more simulation clients.

2. The system of claim 1, wherein the discrete event simulator is accessible by a server program contained in a memory of the simulation server.

3. The system of claim 1, wherein the simulation server accepts input from the two or more simulation clients and translates the input into scenario-driven events that can be understood by the discrete event simulator.

4. The system of claim 1, wherein the simulation server accepts simulation state information from the discrete event simulator, translates the simulation state information into information that can be understood by the two or more simulation clients, and passes the simulation state information to the two or more simulation clients so that each simulation client can update a clock display and a task progress bar on the GUI.

5. The system of claim 1, wherein the simulation server includes a processor and the discrete event simulator runs on the processor.

6. The system of claim 1, wherein the discrete event simulator runs on a different processor than the simulation server.

7. The system of claim 1, wherein the simulation server includes a processor and the one or more of the simulation clients run on the processor.

8. The system of claim 1, wherein the simulation server updates a simulation of a software development process faster than the time necessary to actually update software development process.

9. The system of claim 1, wherein the simulation allows a several-month project in a few hours.

10. The system of claim 1, wherein the simulation server generates scenario-driven events that simulate unplanned interruptions and distractions.

11. The system of claim 1, wherein each simulation client displays a diagram of the software development process on the GUI with a current step in the software development process highlighted, and wherein the diagram explicitly provides a formal and concrete representation of the software development process and the current state of the simulation.

12. The system of claim 1, wherein the GUI of each simulation client includes an instructional window that provides context-sensitive hints and suggestions and displays communication from an instructor.

13. The system of claim 1, further comprising a configuration tool that allows the simulation to be customized for a particular team of users or for a particular development project.

14. The system of claim 13, wherein the configuration tool configures a discrete event simulator of the simulation server to model the particular team of users and the particular development project in the simulation.

15. The system of claim 13, wherein the configuration tool configures the simulation model to include specific instructional scenarios.

16. The system of claim 13, wherein the configuration tool designs and integrates the GUI of each simulation client.

17. The system of claim 13, wherein each software development process has its own vocabulary and mechanisms.

18. The system of claim 1, wherein the simulation server includes a chat server that allows a simulation client to login and communicate with another simulation client that is logged in to the simulation server.

19. The system of claim 1, wherein each client includes a plurality of GUIs including one or more of a user login interface, a prerequisite interface, a configuration interface, a planning interface, a main interface, one or more interfaces specific to the software development process to be taught, and a final result interface.

20. The system of claim 1, wherein the GUI of each client allows the associated user to view instructional material and to interact with the simulation running on the simulation server.

21. The system of claim 1, wherein the GUI of each client includes a simulation clock that indicates how much simulation time has elapsed, depictions of relevant aspects of the current state of the simulation, and means to generate scenario-driven events that impact the simulation.

22. A system for teaching software development processes, comprising:
a simulation server that keeps track of a current state and time of a simulation of a software development process, and generates random and scenario-driven events in the simulation that simulate a project as part of the software development process, wherein the simulation server further includes:
a discrete event simulator, and wherein the discrete event simulator performs discrete event simulation, each discrete event that is simulated having a specified duration, by advancing a simulation clock through the specified duration, wherein the discrete event simulator manages the simulation clock to slow down the simulation so that the two or more users can generate scenario-driven events that are required by the software development process;
two or more simulation clients associated with two or more users, each simulation client including a graphical user interface (GUI) for displaying the current state of the simulation, enabling the associated user to perform simulated process actions as part of the simulation, and enabling the associated user to interact with other users to learn the software development process; and
a network that facilitates communication between the simulation server and the two or more simulation clients.

23. A system for teaching software development processes, comprising:
a simulation server that keeps track of a current state and time of a simulation of a software development process, and generates random and scenario-driven events in the simulation that simulate a project as part of the software development process, wherein the simulation server further includes:
a discrete event simulator, and wherein the discrete event simulator performs discrete event simulation, each discrete event that is simulated having a specified duration, by advancing a simulation clock through the specified duration, wherein the discrete event simulator randomly perturbs the scenario-driven events generated by the two or more users so that the scenario-driven events take more or less time than the two or more users planned;
two or more simulation clients associated with two or more users, each simulation client including a graphical user interface (GUI) for displaying the current state of the simulation, enabling the associated user to perform simulated process actions as part of the simulation, and enabling the associated user to interact with other users to learn the software development process; and
a network that facilitates communication between the simulation server and the two or more simulation clients.

* * * * *